United States Patent

Sahu

Patent Number: 5,413,756
Date of Patent: May 9, 1995

[54] LEAD-FREE BEARING BRONZE

[75] Inventor: Sudhari Sahu, Glendale, Wis.

[73] Assignee: Magnolia Metal Corporation, Omaha, Nebr.

[21] Appl. No.: 262,137

[22] Filed: Jun. 17, 1994

[51] Int. Cl.⁶ .................................................. C22C 9/02
[52] U.S. Cl. ...................................... 420/472; 420/470
[58] Field of Search .............................. 420/472, 470

[56] References Cited

U.S. PATENT DOCUMENTS

| | | |
|---|---|---|
| 2,743,176 | 4/1956 | Thomas et al. |
| 2,849,310 | 8/1958 | Waller. |
| 3,053,511 | 11/1957 | Godfrey. |
| 3,337,338 | 8/1967 | Krock. |
| 3,361,666 | 1/1968 | Webb et al. |
| 3,671,207 | 1/1971 | Lynch et al. |
| 3,912,503 | 10/1975 | Schumacher et al. |
| 4,012,240 | 3/1977 | Hinrichsen et al. |
| 4,123,265 | 10/1978 | Takahashi et al. |
| 4,216,270 | 8/1980 | Lawless et al. |
| 4,373,970 | 2/1983 | Scorey et al. |
| 4,702,887 | 10/1987 | Larson. |
| 4,822,567 | 4/1989 | Kato et al. |
| 4,879,094 | 11/1989 | Rushton. |
| 5,137,685 | 8/1992 | McDevitt et al. |
| 5,167,726 | 12/1992 | LoIacono et al. ............... 420/472 |
| 5,242,657 | 9/1993 | Sahu. |
| 5,288,458 | 2/1994 | McDevitt et al. |
| 5,330,712 | 7/1994 | Singh ........................... 420/472 |

FOREIGN PATENT DOCUMENTS 58-42739 12/1983 Japan.
250721 4/1926 United Kingdom.

*Primary Examiner*—Deborah Yee
*Attorney, Agent, or Firm*—Dorn, McEachran, Jambor & Keating

[57] ABSTRACT

Lead-free copper-tin, low friction, castable bearing bronze alloy for industrial applications as bearing, bushing, and guide parts as well as threaded cast parts, with the following weight percentage range.

Sn = 3–9
Bi = 2.5–9
P = 0–0.3
Zn = 0–1
Ni = 0–2
Pb = 0–0.35
Cu = Balance

12 Claims, 10 Drawing Sheets

● C932 STANDARD
○ C936 LEADED BRONZE
▲ 6BI ⎫
+ 8BIZ ⎬ NEW BISMUTH BRONZE
× 8.5BI ⎭

1, 2 – BUSHINGS WITH OIL GROOVES
3 – FLANGED BUSHING
4 – GUIDE TUBE
5 – PULLEY
6 – THRUST WASHER

LEAD-FREE BEARING BRONZE

BACKGROUND OF THE INVENTION

This invention relates to a lead-free continuously-cast copper-base alloy suited for use as a bearing, bushing, or guide material.

Currently there are different specifications covering many bearing bronzes, the most popular of them being those of Copper Development Association (CDA). Some of these bearing bronzes are lead-free, for example, C903 or C954. Others are leaded, for example, C932 and C936. Lead-free bronzes like C903 and C954 have high coefficient of friction in metal to metal rubbing contact and also have lower machinability compared to leaded bronzes.

Leaded bronzes have good machinability and have low coefficient of friction. However, they contain anywhere from 5 to over 15 percent lead in them. During the past two decades it has been established that ingestion of even a few parts per billion of lead into human body causes severe health problem. As a consequence strong efforts are being made to eliminate lead from materials which ultimately might end up in human beings. Recently considerable efforts have been made to remove or at least reduce the lead content from plumbing brasses that come in contact with potable water. U.S. Pat. No. 4,879,094 is an example.

In bearing and bushing bronzes lead is used primarily as a lubricating agent which also helps machinability. Currently there are many pump installations handling water that contain leaded bearings. Lead from them can possibly contaminate water being pumped. Furthermore, many machine shops buy lead containing bars and tube stocks to machine them into bushings and bearings. This might expose machinists to lead-bearing dusts if not fully protected. Additionally, lead-bearing scrap requires proper handling and recycling to prevent lead from entering the environment.

This establishes the need for a low friction bearing alloy which does not contain any highly toxic material like lead. In fact, there are already are some lead-free alloys with low friction. Examples are nickel-base alloys of Thomas and Williams (U.S. Pat. No. 2,743,176) and of Larson (U.S. Pat. No. 4,702,887) and copper-nickel alloy of Sahu (U.S. Pat. No. 5,242,657). However, these alloys are many times more expensive than common bearing alloys like C932 and C936.

SUMMARY OF THE INVENTION

The preferred analysis of my alloy is as follows:

| Element | Weight Percent |
| --- | --- |
| Copper | Balance |
| Tin | 7.00 |
| Bismuth | 5.00 |
| Phosphorus | 0.10 |

Variation in the above chemistry is possible and a satisfactory alloy can have the following chemical ranges:

| Element | Weight Percent |
| --- | --- |
| Copper | Balance |
| Tin | 3–9 |
| Bismuth | 2.5–9 |
| Phosphorus | 0–0.3 |
| Zinc | 0–1 |
| Lead | 0–0.35 |
| Nickel | 0–2 |

This alloy may contain small amounts of C, Si, Fe, Mn, Al, and other elements as incidental or trace elements. Zinc may be present in some scrap metal sources used for the melt and can be tolerated in amounts up to about 1% by weight.

When the ingredients are mixed in approximately the preferred analysis the following data will describe its physical properties.

| Tensile Strength | 30,000–45,000 psi |
| --- | --- |
| Yield Strength | 19,000–28,000 psi |
| Percent elongation in 2" | 10.0–25.0 |
| Brinell hardness | 65–95 |

DESCRIPTION OF THE PREFERRED EMBODIMENTS

In its methods aspects the alloy can be melted in a gas fired crucible or an electric induction furnace. Copper is charged into the melting vessel and when it is completely molten, the slag on the top is drawn to one side and tin, bismuth and phosphorus-copper shot are added to the melt.

The melt is transferred into a bottom tapped holding crucible where it is fed through a graphite die to form a continuously cast solid, tube or other shape as desired. Test samples were prepared this way. In addition, the melt may be tapped into a variety of molds such as sand, steel or graphite to obtain the castings of desired shape.

The chemistry of five heats continuously cast into bars and tubes are as given in Table 1. Also included in this table, for the sake of comparison, are two current leaded bearing bronzes, (C932 and C936) and two current lead-free bronzes (C954 and C903). Chemistries and physical properties reported for C932, C936, C954 and C903 are nominal as published by Copper Development Association.

TABLE 1

| | Chemistry of Bearing Bronzes (Percent by weight) | | | | | | | | |
|---|---|---|---|---|---|---|---|---|---|
| Alloy ID | Cu | Sn | Pb | Zn | Bi | Ni | P | Al | Fe | Remarks |
| C932 | 83 | 7 | 7 | 3 | — | — | — | — | — | Leaded Bronze |
| C936 | 90 | 7 | 12 | 1 | — | — | — | — | — | " |
| C954 | 85 | — | — | — | — | — | — | 11 | 4 | Lead-free Bronze |
| C903 | 88 | 8 | — | 4 | — | — | — | — | — | " |
| BI-4 | Bal | 6.14 | — | — | 3.81 | .03 | .06 | — | — | Bismuth Bronze |
| 6BI | Bal | 5.02 | — | — | 5.32 | .01 | .01 | — | — | " |
| 6BIP | Bal | 4.85 | — | — | 5.29 | .01 | .09 | — | — | " |
| 8BIZ | Bal | 7.51 | — | .085 | .32 | .01 | .01 | — | — | " |
| 8.5BI | Bal | 8.14 | — | — | 6.34 | .01 | .03 | — | — | " |

Mechanical Properties of the above alloys are given below:

TABLE 2

| | Mechanical Properties of Bearing Bronzes | | | |
|---|---|---|---|---|
| Alloy ID | Tensile Strength, psi | Yield Strength, psi | % Elongation in 2" | Hardness BHN |
| C932 | 35,000 | 18,000 | 20.0 | 65 |
| C936 | 35,000 | 21,000 | 15.0 | 65 |
| C954 | 85,000 | 35,000 | 18.0 | 170 |
| C903 | 45,000 | 21,000 | 30.0 | 70 |
| BI-4 | 40,200 | 21,800 | 23.0 | 72 |
| 6BI | 31,000 | 20,100 | 10.5 | 72 |
| 6BIP | 35,900 | 19,000 | 20.0 | 73 |
| 8BIZ | 35,900 | 23,100 | 13.5 | 80 |
| 8.5BI | 44,100 | 25,300 | 17.5 | 89 |

Comparison of mechanical properties of five heats of lead-free alloy with standard alloys (C932 and C936) indicates that the new alloy has properties comparable to the current alloys. Besides, the strength and elongation can be adjusted within limits by adjusting the percentage of tin and phosphorus in the alloy.

FRICTION PROPERTIES

Figure 1:
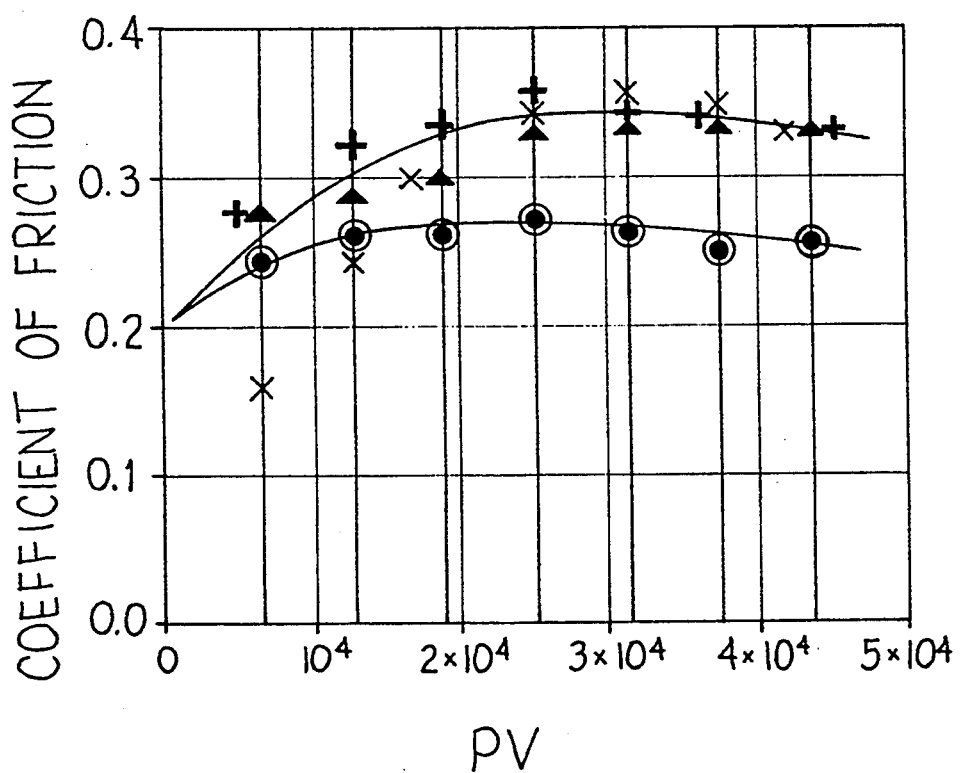
FIG. 1 is a graph showing the coefficient of friction versus pressure velocity for various alloys.

The most crucial property of a bearing/bushing alloy is its low coefficient of friction (static and dynamic) in dry and marginally lubricated condition. The dynamic test was run according to modified ASTM D3702 method. Rings of standard alloy (C932 and C936) and the new alloy (6BI, 8BIZ, and 8.5BI) were run against hardened (56 RC) 440C stainless steel washers at room temperature in distilled water. Coefficients of friction (C.O.F.) were measured for given PV values and are given Table 3 below and also plotted in FIG. 1. Pressure P is measured in pounds per square inch and velocity V is measured in feet per minute. The product function PV is a measure of severity to which specimen is subjected during the test. The higher the PV value, the more severe the loading.

TABLE 3

| | Coefficient of Friction at Various PV Values | | | | | | | |
|---|---|---|---|---|---|---|---|---|
| Alloy | PV = 6250 | PV = 12,500 | PV = 18,750 | PV = 25,000 | PV = 31,250 | PV = 37,500 | PV = 43750 | Average |
| C932 | .236 | .272 | .286 | .277 | .271 | .251 | .257 | .264 |
| C936 | .240 | .262 | .262 | .275 | .268 | .245 | .264 | .259 |
| 6BI | .278 | .290 | .299 | .322 | .319 | .321 | .317 | .307 |
| 8BIZ | .278 | .320 | .331 | .343 | .337 | .335 | .317 | .323 |
| 8.5BI | .166 | .251 | .295 | .330 | .356 | .339 | .319 | .293 |

Two specimens were run for each of the above alloys and the average of two values has been reported above. It should be mentioned here that even at the highest PV value tested none of the above alloys showed any signs of galling. In industrial applications, bearings will rarely se values of PV greater than 40,000 and certainly not in marginal lubrication. It is seen from Table 3 that the standard alloy (C932 and C936) has an average C.O.F. of 0.26 and the new alloy (6BI, 8BIZ, and 8.5BI) has an average C.O.F. of 0.31. Even though friction value for the new alloy is slightly higher than that of standard alloy, it is still low and perfectly acceptable. Leaded dairy metal bearings/bushings which have worked satisfactorily in the field can have friction values of 0.45 (U.S. Pat. No. 5,242,657).

Figure 2:
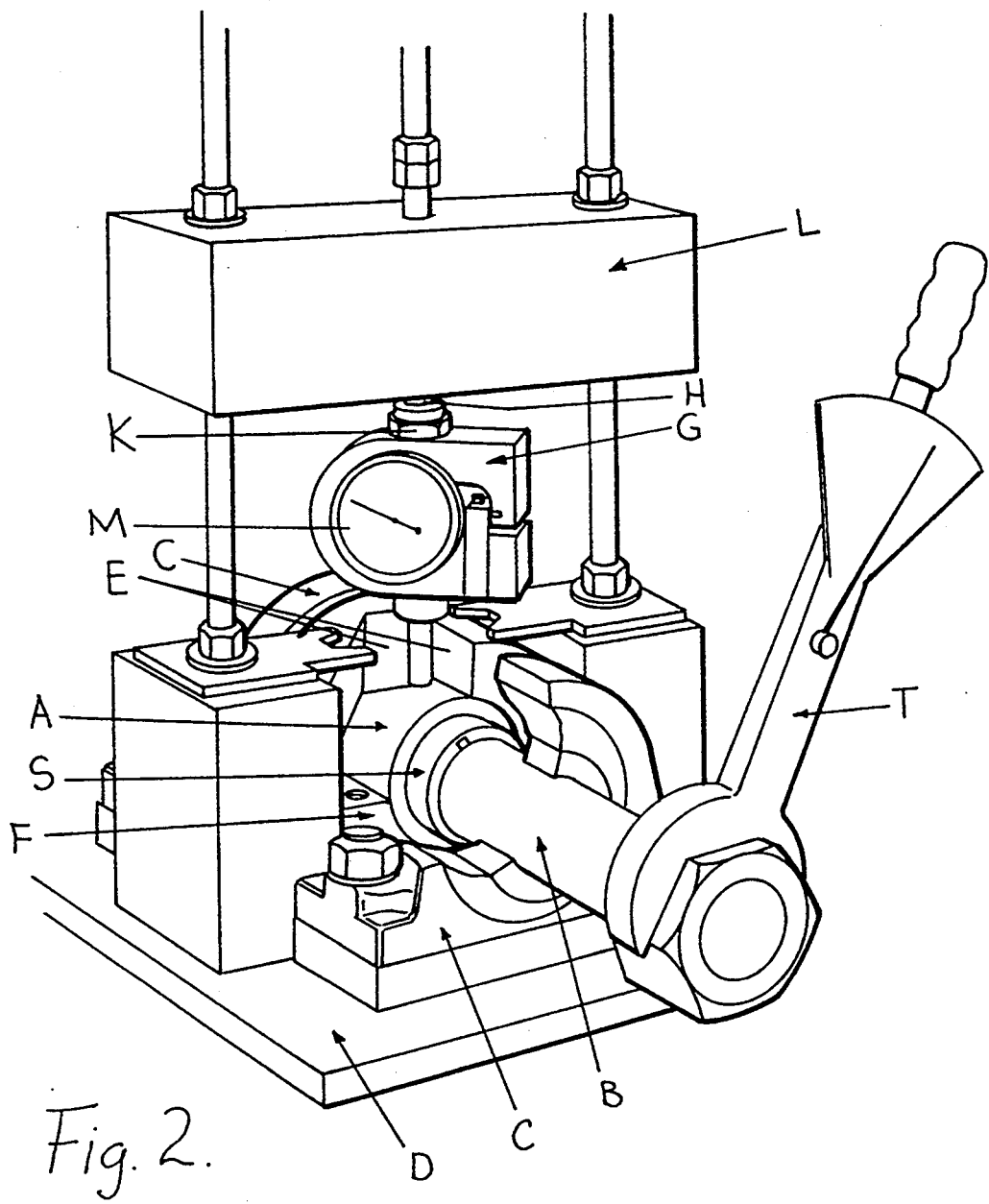
FIG. 2 is a perspective view of a bearing/bushing test fixture.

Static friction test was run on a simulated bearing-/bushing test fixture shown in FIG. 2. Hardened steel sleeve S is keyed to the shaft B which passes through two roller bearings in pillow blocks C. The pillow blocks are rigidly fastened to the base D. Bronze sleeve bushing A is slipped over the hardened steel sleeve and there is only 0.002| diametrical clearance between the two. The bushing is surrounded by two half blocks E and F, the internal contours of which matches that of the bushing to be tested. A load cell G mounted on block E has a cylindrical rod extending from its bottom portion. The spherical end of this rod passes through a hole in block E and touches a machined seat on the test bushing. There is a threaded bolt H on the top of the load cell having a nut K. By turning the nut the bolt H can be moved up or down. Bolt H touches the cross-bar L which is rigidly fastened to the base frame. The load generated by turning nut is transmitted through the block E to the bushing A and is read off the load-cell dial M. A calibrated torque wrench T attached to one end of the shaft B is used to turn the shaft.

Steel sleeve S and the bushing A were thoroughly cleaned and degreased before installing on the test fixture. The bushing has an internal diameter (ID) of 2.125 inches, outer diameter (OD) of 2.750 inches and a length 2.1875 inches. The length of steel sleeve was 3 inches and extended on both sides of the bushing equally. During the experiment a load P of 500 lbs was applied to the bushing and the torque required to rotate the shaft, T, at 1 to 2 RPM was measured. The value of static coefficient of friction is thus T/1.0625P. The load was increased to 750 lbs and again the torque required to rotate the shaft at slow speed was measured. Subsequently, the load was increased to 1000 and 1250 lbs and corresponding values of torque were measured. Next the load was decreased to 1000, 750, and 500 lbs. in successive steps and corresponding values of torque measured. Thus for a single bushing seven values of C.O.F. were calculated—four during loading and three during unloading. The maximum spread in values of C.O.F. for a single bushing was 0.04. The average of these seven values is reported in the following table. Five bushings from each alloy were tested and the results are given in Table 4.

TABLE 4

Static Coefficient of Friction for Bearing Bronzes

| Alloy ID | Spl 1 | Spl 2 | Spl 3 | Spl 4 | Spl 5 | Average |
|---|---|---|---|---|---|---|
| C932 | .17 | .16 | .20 | .19 | .18 | .18 |
| C936 | .17 | .20 | .19 | .13 | .19 | .18 |
| 6BI | .19 | .12 | .17 | .14 | .21 | .17 |
| 6BIP | .21 | .13 | .20 | .21 | .19 | .19 |
| 8BIZ | .23 | .21 | .24 | .22 | .19 | .22 |
| 8.5BI | .19 | .18 | .19 | .19 | .17 | .18 |

It can be seen from the above table that the average static coefficient of friction for the new alloy (6BI, 6BIP, 8BIZ and 8.5BI) is comparable to those of the standard alloys (C932 and C936).

Bronze bushings and bearings are also designed to be a sacrificial item. In other words, they should wear out preferentially leaving the shaft or journal unaffected. During modified ASTM D-3702 friction test weight loss of bearing materials as well as the hardened steel was measured and the results are given below. It should be noted here that each value is average of two readings.

TABLE 5

Weight Loss During Ring on Washer Test (D-3702)

| Alloy ID | Average Weight loss, mg, for Rings | Average Weight Loss of Mating Hard 440 C Washer, mg |
|---|---|---|
| C932 | 179 | 1 |
| C936 | 117 | 1 |
| 6BI | 122 | 1 |
| 8BIZ | 268 | (2)* |
| 8.5 BI | 87 | (1)* |

*Weight gain due to transfer of metal from ring to washer

It is seen from the above table that all bushing materials, new as well as standard, wear out two orders of magnitude faster than the hard steel mating part.

WEAR PROPERTIES

Figure 3:
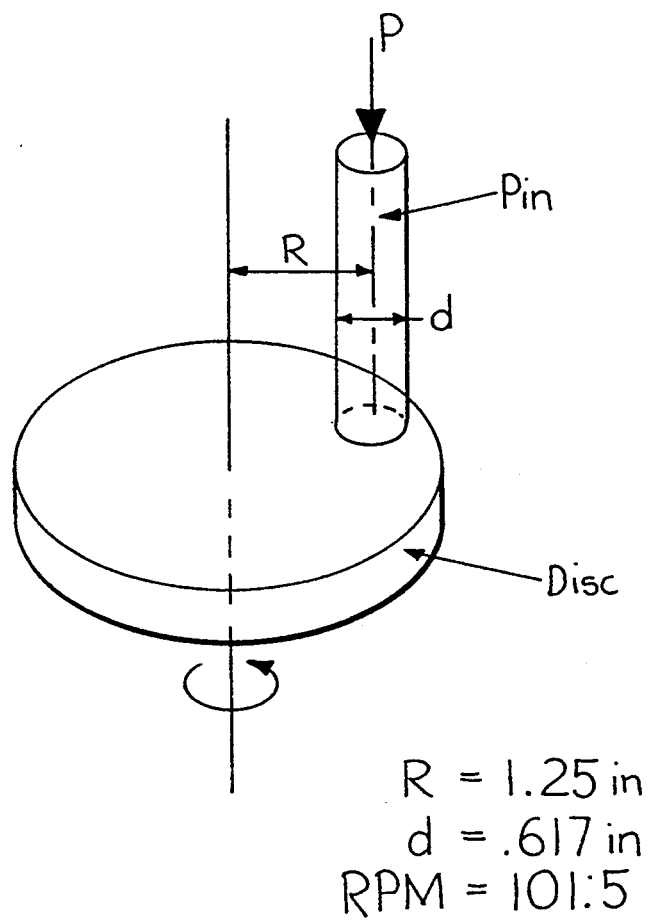
FIG. 3 is a perspective view of a pin on disc galling test apparatus.

Pin-on-disc apparatus was used to run wear test per modified ASTM G-99 specification. FIG. 3 shows the pin-on-disc arrangement. Bearing bronze pins were loaded against a disc (316 SS or 440C) which rotated at a speed of 101.5 RPM. The 316 SS disc had a hardness of around 170 BHN and 440C disc had a hardness of 56 RC. The load applied to the pin was either 42.5 pounds or 32.5 pounds giving PV values of 9420 and 7204 respectively. The disc and the lower portion of the pin were immersed in water. The duration of the test was one hour. It should be noted that the disc surface was sanded on 80 grit paper and the pin end was sanded on 250 grit emery paper.

At the end of the test both contacting surfaces were examined for any sign of galling and it was found that there was no galling on either surface. The weight loss of the pin was calculated from its initial and final weights. Two specimens were tested for each condition and the average results are given in the tables below.

TABLE 6

Weight Loss of Bearing Bronze Against 440C

| Alloy ID | Average Weight Loss of Pin, Grams | |
|---|---|---|
| | PV = 9420 | PV = 7204 |
| C932 | .104 | .105 |
| C936 | .164 | .097 |
| BI4 | .187 | .206 |
| 6BI | .232 | .155 |
| 6BIP | .195 | .148 |
| 8BIZ | .155 | .091 |
| 8.5BI | .103 | .081 |

TABLE 7

Weight Loss of Bearing Bronze Against 316 SS

| Alloy ID | Average Weight Loss of Pin, Grams | |
|---|---|---|
| | PV = 9420 | PV = 7204 |
| C932 | .138 | .117 |
| C936 | .148 | .144 |
| BI4 | .176 | .154 |
| 6BI | .177 | .151 |
| 6BIP | .209 | .132 |
| 8BIZ | .116 | .093 |
| 8.5BI | .082 | .063 |

It can be seen from the above tables that the new alloy has wear rate comparable to standard alloys C932 and C936. As a matter of fact alloys like 8BIZ and 8.5BI have much less wear than C932 and C936.

MACHINABILITY AND SURFACE FINISH

Machinability and surface smoothness of an alloy is very important in determining the cost of the finished product. Faster the alloy can be machined, the lower the cost of the end product. For products like bearings and bushings the maximum surface roughness is given by the established specification. In order to get a better surface finish the depth of cut and/or the feed rate are reduced providing all other parameters including the type and geometry of the cutting tool are fixed.

Figure 4:
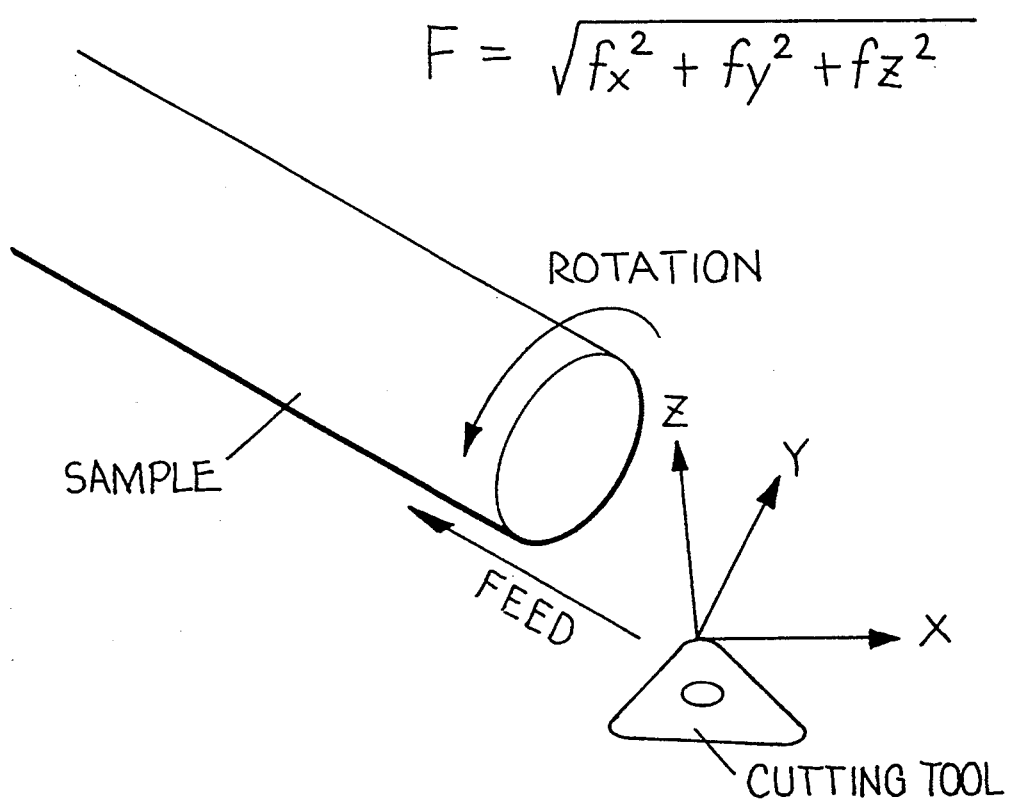
FIG. 4 of the drawings shows a lathe cutting operation.

During present invention, the machinability was measured using a tool post dynamometer on a conventional lathe. For the turning operation, the x, y, and z components of the force were measured s shown in FIG. 4. The net force F was taken as the square root of the sum of x, y and z components squared.

$$F = (fx^2 + fy^2 \times fz^2)^{\frac{1}{2}}$$

The diameter of the bar was 1.46 inches, rotational speed 360 RPM, depth of cut 0.010 inches and the feed rate was 0.005 inches per revolution. The roughness of the machined surface was also measured with a profilometer. Four samples from each alloy were tested for machining force and the surface finish. The average of these readings are presented below.

TABLE 8
Machinability and Surface Finish of Bearing Bronzes

| Alloy ID | Machining Force, lbs. | Machinability Rating | Surface Finish Microinch |
| --- | --- | --- | --- |
| 6BIP | 9.3 | 90 | 39 |
| BI4 | 10.7 | 78 | 36 |
| C936 | 10.9 | 76 | 41 |
| C932 | 11.9 | 70 | 41 |
| 8BIZ | 12.5 | 67 | 37 |
| 8.5BI | 15.1 | 55 | 39 |
| 6BI | 17.1 | 49 | 55 |
| C954 | 18.0 | 46 | 27 |
| C903 | 21.4 | 39 | 213 |

For comparison purposes two lead-free bearing bronzes, namely, C954 and C903 were included in machinability studies. Of these C954 is an aluminum bronze and C903 is a tin bronze. The force required to machine a part is a measure of machining difficulty. Lower machining force means better machinability. For ease in comparison the machineability of C932 was given a number of 70 to match the value given in the CDA handbook. Column 3 in Table 8 gives machinability of other alloys. It is seen in this column that machinability of bismuth bearing alloys, namely, 6BIT, BI4, 8BIZ, 8.5BI, and 6BI ranges from 90 down to 49 with an average of 68. In other words bismuth-bearing bronzes have machinability comparable to C932. In any case, the main aim, of the present invention is removal of lead from the alloy and machinability is of secondary importance.

As can be seen from column 4 in Table 8 the surface finish of bismuth-bearing alloys is similar to those of C932 and C936. As a matter of fact, the average finish of five bismuth-bearing alloys is identical to C932/C936. Surprisingly, C903 had a much rougher surface.

CASTABILITY

Castability of bismuth-bearing bronze was similar to leaded bronze. The speed with which continuously case bar or tube could be withdrawn from the die was same as that of leaded bronze. The cast bars had good surface finish and cross-sections were fully sound and defect-free. In summary, there is no difference between castabilities of leaded and bismuth-bearing bronzes.

CORROSION

The corrosion resistance of a bearing alloy in different environments is very important. In use the bearing-/bushing encounters gaseous or liquid corrodants. For example, in oil drilling the bushing will see sour gas ($H_2S$), near sea shore it will encounter salty water and in the paper and pulp mill the part will see paper mill fluid. In order for the new alloy to replace current leaded bronze, the new alloy must have corrosion resistance comparable to or better than the current alloy. The following four solutions were selected to compare the corrosion resistance of new and current bearing bronzes.

1. 5 weight percent of sodium hydroxide (NaOH) in water.
2. Simulated Sea Water: This was prepared by dissolving 3 weight percent sodium chloride (NaCl) and 0.5 weight percent sodium sulphate ($Na_2SO_4$) in water.
3. Simulated Paper-Mill Liquid: This was prepared by adding to one liter of water the following amounts of different chemicals.

NaCl = 0.655 gram
$Na_2SO_4$ = 5.917 gram
$Na_2S_2O_3$ = 0.063 gram
$Na_2SO_3$ = 0.132 gram 4. Sour gas ($H_2S$) Solution: One liter of this solution had 995 mililiter of water and 5 mililiter of concentrated acetic acid. This solution was saturated with $H_2S$ by constantly bubbling the gas through the solution.

The corrosion test was run according to ASTM Spec. G31-72. The specimen was in the form of a circular disc with nominal OD = 1.250″, ID = 0.375″ and thickness = 0.187″. The specimen was properly prepared and its dimensions and weight were measured. The specimen was put inside a one liter solution of one of the above compounds in a wide-mouth flask. All the solutions except the sour gas ($H_2S$) was kept at 50 degrees C. and mildly agitated with a magnetic stirrer. Sour gas ($H_2S$) solution was kept at ambient temperature and the agitation was provided by gas bubbles. The specimen was kept in the solution for 48 hours. At the end of this period, the specimen was taken out, washed thoroughly and re-weighed. From the weight loss and dimensions of the specimen the corrosion rate in mils per year was calculated. Duplicate specimens were run for each condition and the reported corrosion rate is average of the two readings. The following table lists the details:

TABLE 9
Corrosion Rate of Bearing Bronze in Mils per Year

| Alloy | NaOH | Sea Water | Sour Gas, H2S | Paper Mill Soln. |
| --- | --- | --- | --- | --- |
| C932 | 46.1 | 7.1 | 2.9 | 5.3 |
| C936 | 54.1 | 6.3 | 0.3 | 4.3 |
| BI4 | 36.6 | 7.6 | 0.9 | 6.3 |
| 6BI | 36.5 | 6.6 | 1.2 | 3.9 |
| 6BIP | 51.8 | 7.3 | 1.5 | 5.3 |
| 8BIZ | 40.0 | 8.1 | 0.8 | 3.5 |
| 8.5BI | 59.9 | 7.5 | 0.4 | 4.9 |

Generally speaking a corrosion rate of less than 20 mils per year is considered good. On this basis, both standard leaded bronze (C932 and C936) and all new bismuth-bearing alloys have good corrosion resistance in sea water, sour gas and paper-mill solution. In 5% NaOH solution, the corrosion resistance of standard alloys as well as new alloys is marginal. However, the average corrosion resistance of the new alloy (BI4, 6BI, 6BIP, 8BIZ and 8.5BI) is as good as standard alloys (C932 and C936).

In bearing bronzes zinc has a tendency to selectively leach-out in many environments. This phenomenon is referred to as "dezincification". This can be seen by comparing the corrosion rates of C932 and C936 in sour gas ($H_2S$) solution. The alloy of the present invention, for this reason, does not contain any zinc in it.

Figure 5:
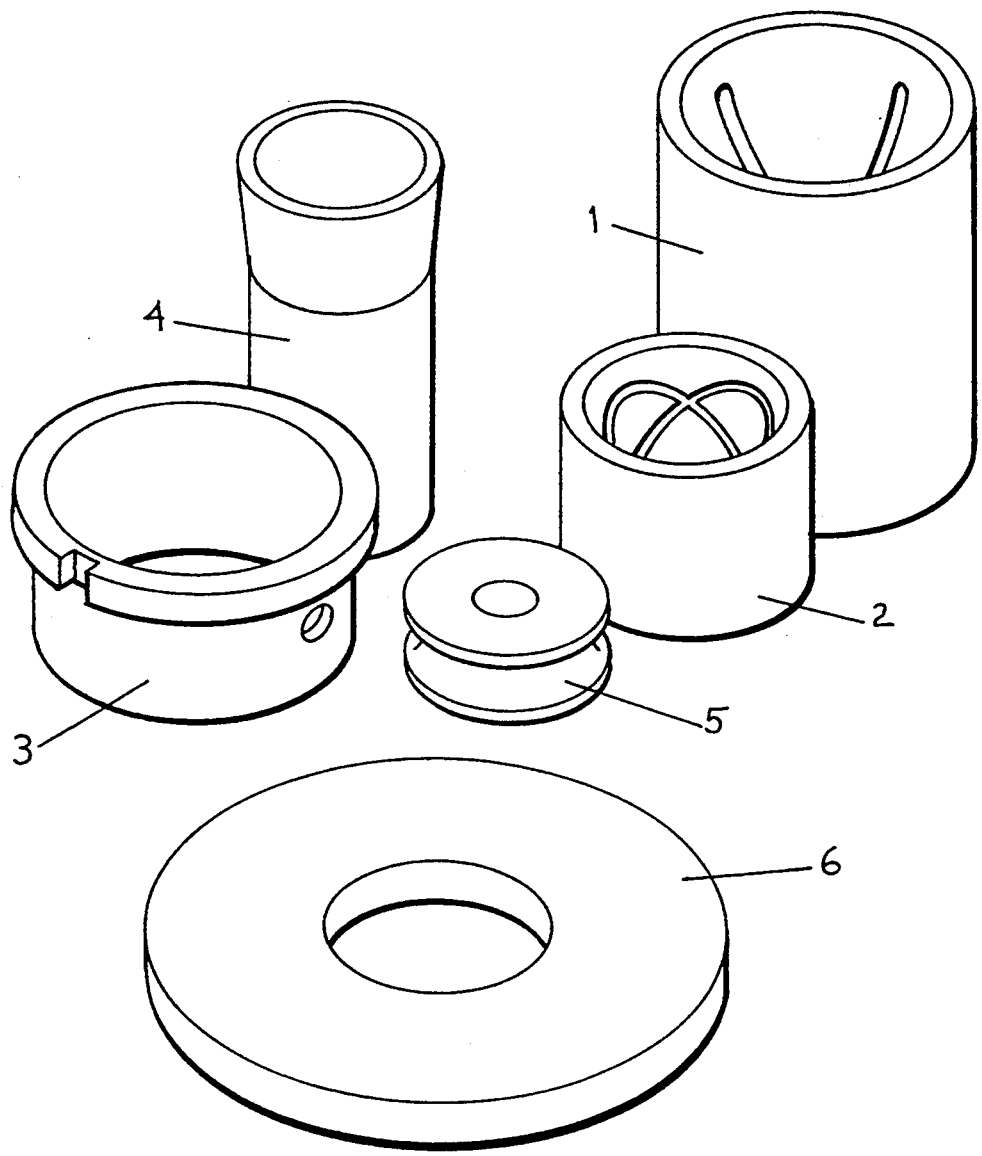
FIG. 5 is a perspective view of machinery parts in which the present invention may be embodied.
Figure 6:
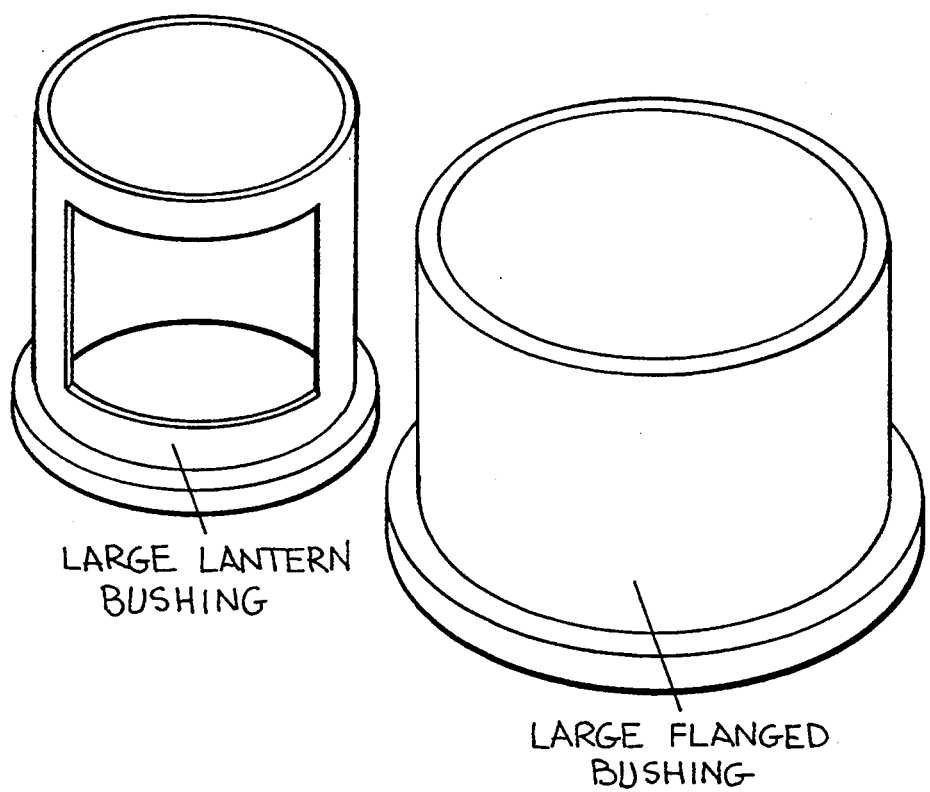
FIG. 6 is a perspective view of parts made in permanent molds in which the present invention may be embodied.
Figure 7:
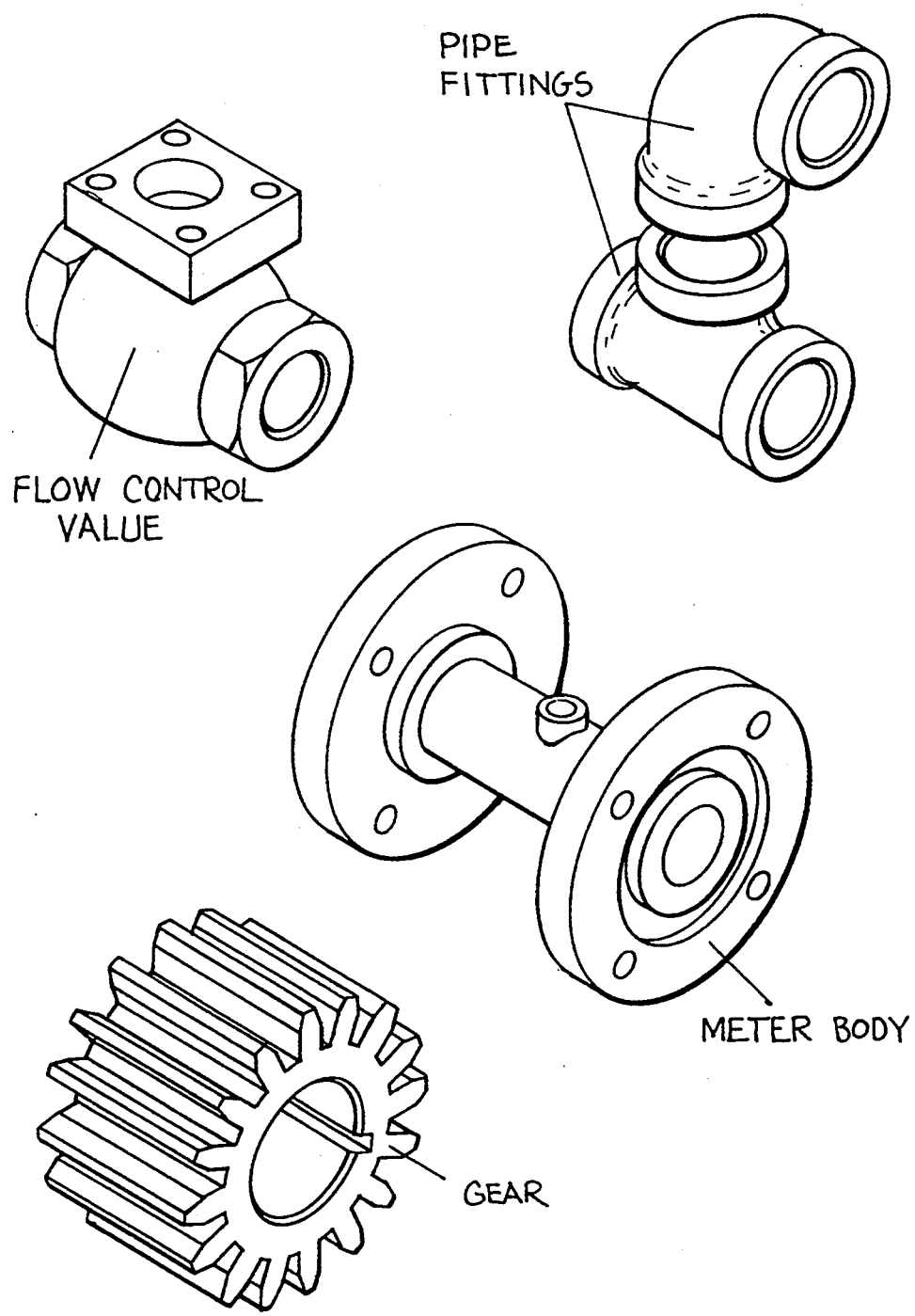
FIG. 7 shows sand molded parts which may be molded with the alloy of this invention.

Parts machined from continuously cast new alloy can have numerous variations in shape, size and design. A few of them are shown in FIG. 5. These include bushings, bearings, pulleys, thrust washers and guide tube. The new alloy can also be poured into permanent molds made of steel, graphite, etc., to get the parts of desired shape and size. Two examples of these are shown in FIG. 6; one is a large size, say 24 inch ID, standard flange bushing and the other is a lantern bushing of a similar size. Further, the new alloy may be poured in regular sand mold to get parts of desired shape and size. Some examples of these are shown in FIG. 7.

Figure 8:
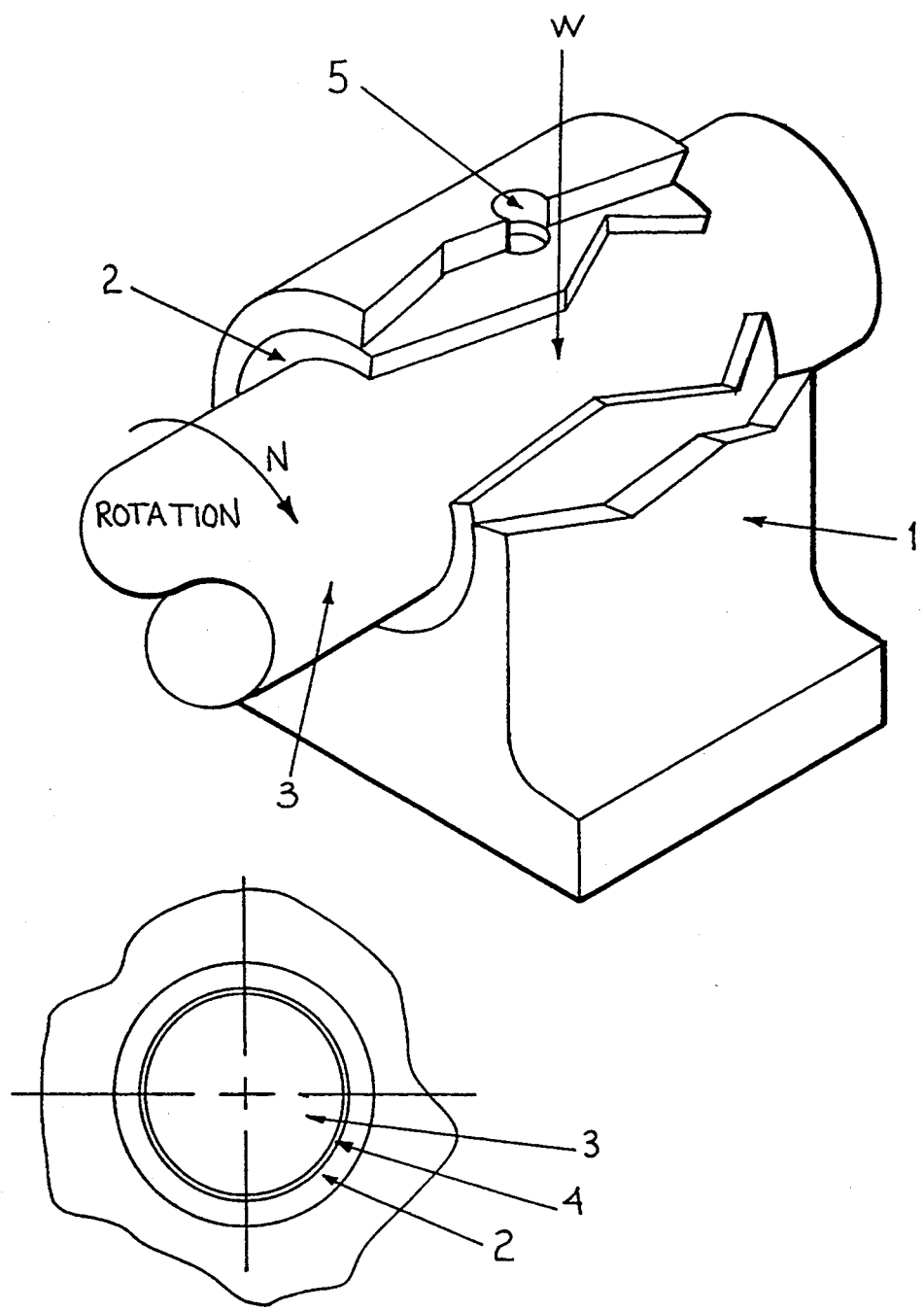
FIG. 8 shows the use of bearings made in accordance with the teachings of this invention.
Figure 9:
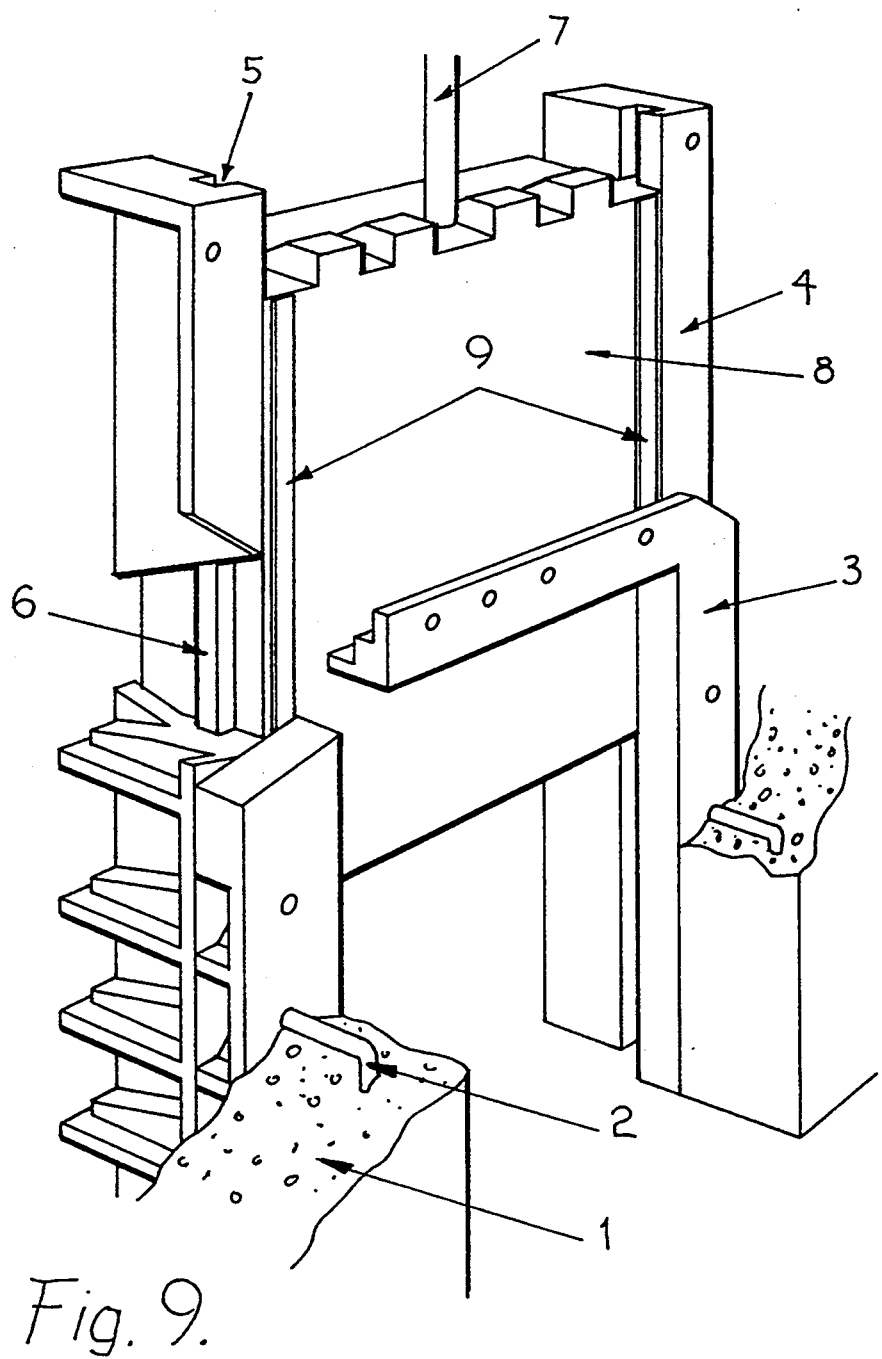
FIG. 9 is a perspective view of a sluice gate assembly for a water reservoir utilizing the alloy of this invention.
Figure 10:
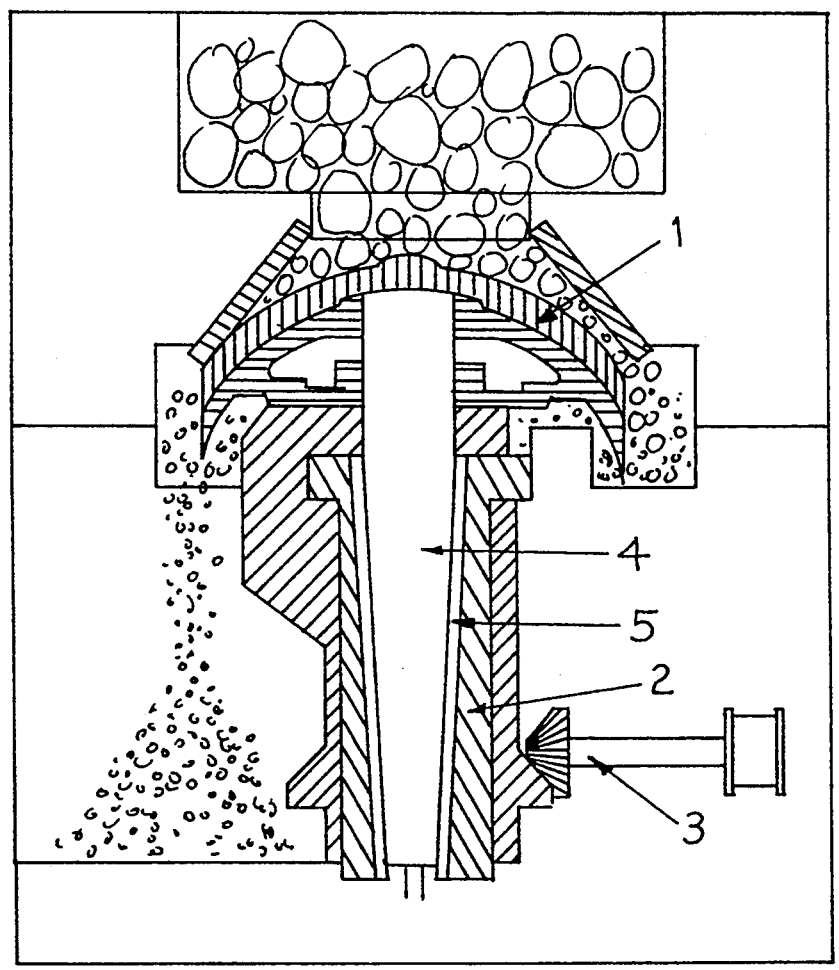
FIG. 10 is a gyroscopic cone crusher using bearings made in accordance with the teachings of this invention.

Three examples of typical arrangements in which the present alloy may be embodied are shown in FIGS. 8, 9, and 10. FIG. 8 depicts one end of a transmission shaft (journal) through which power is transfered from a power source, say an electric motor, to other mechanisms. The steel shaft 3 passes through the bronze sleeve bushing 2 made from the new alloy. This bushing is held in place by the bearing housing 1 made of standard steel or iron. There is no relative motion between bearing 2 and the housing 1. There is small gap 4 between the journal 3 and the bearing 2 which contains a lubricant, heavy oil or grease, supplied through the access hole 5. During operation, the journal 3 rotates inside the bronze bearing 2 and the load W is transmitted through the lubricant to the bearing to the housing and ultimately to the building structure. In case of temporary lubricant failure the bearing 2 has enough in-built lubrication because of dispersed bismuth pools in the matrix that the journal does not get scuffed or damaged.

FIG. 9 depicts a sluice gate assembly for a water reservoir. The frame 3, guide 4, stem 7, and gate 8 may be constructed out of wrought carbon steel. Bronze seat facing 9 may be made out of present alloy. The steel frame 3 is secured to concrete wall 1 by anchor bolts 2. The guide 4 is permanetly attached to frome 3. During operation when gate 8 is lowered by mechanized stem 7, the gate is led into the proper position by gate guide 6 moving through the guide slot 5. The design of the assembly is such that as the gate goes down the bronze seat facings 9 get closer and closer to the machined face of frame 3. By the time the gate is completely down the bronze seat facings seat tightly against the frame completely closing the water flow.

FIG. 10 depicts a gyrasphere crusher used in crushing of mining aggregates. The motion of spherical crushing head 1 is effected through a combination actions of eccentric 2 driven by gear 3 and spindle 4 with help from cams and rollers not shown in the figure. Bronze bushing 5 is fastened to eccentric 2. During crusher operation eccentric 2 moves around spindle 4 and the bushing 5 reduces the friction between the two moving parts.

While there is reference specifically to mechanical elements in the form of bushings, bearings and guides, the term "bushing" is taken herein as generic to all such elements.

I claim:

1. A lead-free copper-tin, low friction, cast bronze alloy consisting essentially of in weight percentage:
   $Sn = 7$,
   $Bi = 5$,
   $P = 0.10$
   $Cu = $ Balance, substantially 2. A cast lead-free copper-tin bearing bronze alloy consisting essentially in weight percentage range:
   $Sn = 3-9$
   $Bi = 2.5-9$
   $P = 0-0.3$
   $Zn = 0-1$
   $Ni = 0-2$
   $Pb = 0-0.35$
   $Cu = $ Balance, substantially 3. In an industrial application in which opposed members are in moving contact with one another, one of said members being fabricated of an alloy according to claim 1.

4. In an industrial application in which opposed members are in contact with one another, one of the said members being fabricated of an alloy according to claim 1 and the other member being of steel.

5. In an industrial application in which opposed members are in contact with one another, at least one of the said members being fabricated of an alloy according to claim 2.

6. In an industrial application in which opposed members are in contact with one another, one of said members being fabricated of an alloy according to claim 2 and the other member being of steel.

7. In a mechanical installation having a journal member and a bushing member, the said bushing member being fabricated of the alloy according to claim 1.

8. In a mechanical installation having a journal member and a bushing member, the said bushing member being fabricated of the alloy according to claim 1.

9. In a Sluice gate assembly having a frame and a gate, the seat facing of the gate being fabricated of the alloy according to claim 1.

10. In a Sluice gate assembly having a frame and a gate, the seat facing of the gate being fabricated of the alloy according to claim 2.

11. In a gyrasphere crusher having a spindle and an eccentric the sleeve facing of the eccentric being fabricated of the alloy according to claim 1.

12. In a gyrasphere crusher having a spindle and an eccentric the sleeve facing of the eccentric being fabricated of the alloy according to claim 2.

* * * * *